July 20, 1926.
C. L. JOHNSON
1,592,977
GEAR SHIFT LEVER AND SWITCH CONTROL MECHANISM
Filed May 23, 1923
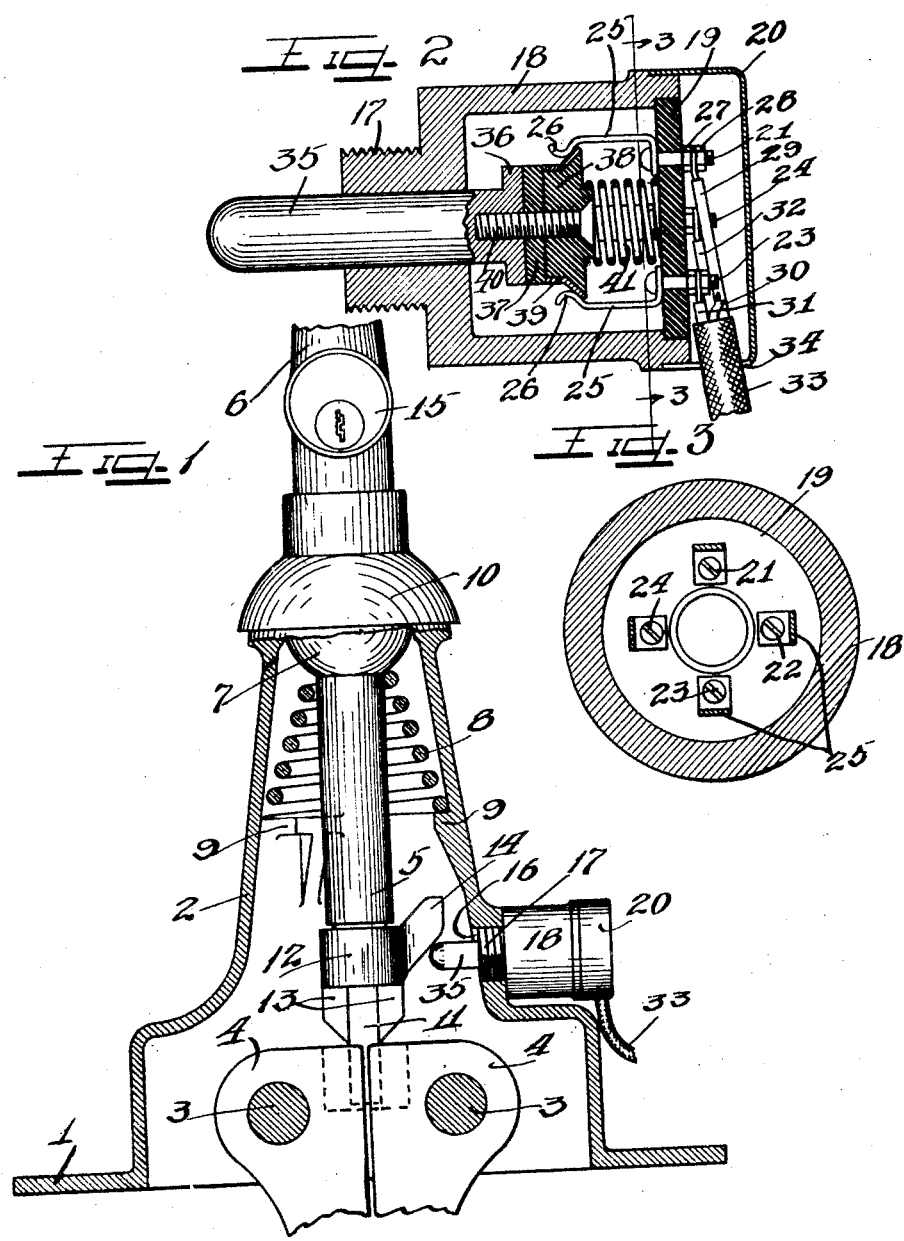

Patented July 20, 1926.

1,592,977

UNITED STATES PATENT OFFICE.

COLVIN L. JOHNSON, OF ST. LOUIS, MISSOURI, ASSIGNOR TO JOHNSON AUTOMOBILE LOCK CO., OF ST. LOUIS, MISSOURI, A CORPORATION OF ILLINOIS.

GEAR-SHIFT LEVER AND SWITCH-CONTROL MECHANISM.

Application filed May 23, 1923. Serial No. 640,885.

This invention relates more particularly to an improved electrical switch mechanism adapted to be automatically operated by means of the locking member of a gear shift lever to cause opening of a plurality of electrical circuits when the locking member is moved into a locking position to hold the gear shift lever locked against operation.

It is an object of this invention to mount a switch mechanism on the gear shift lever supporting housing of a vehicle in such a position that the switch will be operated when a gear shift lever locking member slidable on the gear shift lever is moved into a locking position to engage the shifting members of the vehicle transmission.

It is also an object of the invention to provide a control switch for the electric circuits of a vehicle, said switch adapted to be opened by a key-operated locking member which serves to lock the vehicle gear shift lever against movement.

It is a further object of this invention to mount a circuit control switch on the gear shift lever supporting housing with the switch contact member projecting into the field of operation of the gear shift lever locking member to be actuated thereby.

It is an important object of this invention to provide a switch mechanism for controlling a plurality of the electrical circuits of an automobile, said switch mechanism having a member projecting into the gear shift lever supporting housing and into the path of movement of a key operated locking member which is slidably engaged on the gear shift lever and adapted to contact said member to cause opening of the electrical circuits when said locking member is moved into a locking position co-acting with the shiftable members of the automobile transmission.

Other and further important objects of this invention will be apparent from the disclosures in the specification and accompanying drawings.

The invention (in a preferred form) is illustrated in the drawings and hereinafter more fully described.

On the drawings:

Figure 1 is a central vertical section through a vehicle gear shift lever supporting housing showing the lower portion of a gear shift lever in elevation and illustrating a switch and an actuating means therefor embodying the principles of this invention.

Figure 2 is an enlarged longitudinal section through the switch with parts in elevation.

Figure 3 is a detailed section taken on line 3—3 of Figure 2.

As shown on the drawings:

The reference numeral 1 indicates the cover plate of an automobile transmission case having integrally formed thereon an upright housing or pedestal 2, in which are mounted the slidable transmission rods 3. Secured on the rods 3 are the notched blocks or ordinary gear shift fork members 4. Projecting into the housing 2 is the lower end or tail piece 5 of a gear shift lever 6. A ball 7 is formed on the gear shift lever and is supported on the upper end of a heavy coiled spring 8 mounted within the housing 2 and resting on lugs 9. A hood 10 is mounted on the gear shift lever 6 above the ball 7 and serves to cover the upper end of the housing 2. The lower end of the gear shift lever tail piece 5 is reduced in diameter to form a stem 11, on which is slidably engaged a collar 12 having integrally formed on the bottom thereof two oppositely disposed locking lugs or fingers 13 adapted when the collar is lowered to engage in the notches in the blocks 4 to hold the gear shift lever 6 locked against operation in a neutral position. Also integrally formed on the outer periphery of the collar 12 is an upwardly inclined arm 14. The shiftable collar 12 is connected by means of a rod with a key operated lock 15 which is mounted in the gear shift lever 6 above the hood 10.

The mechanism for operating the collar 12 from the lock 15 is similar to the construction disclosed in my Patent No. 15,105 for a "gear shift lever lock", re-issued May 17, 1921.

Threaded into a threaded opening 16 in one side of the housing 2 is a threaded collar or shank 17, which is integrally formed on one end of a switch casing 18. Secured in the other or open end of the case 18 is a terminal plate 19 of insulating material. A hood or cap 20 is secured to the outer end of the case 18 to enclose the terminal plate 19.

Secured on the inner surface of the plate 19 by means of terminal screws 21, 22, 23 and 24 are four metal contact arms 25, the ends of which are bent to form contact hooks 26. The outer ends of the terminal screws project into the head 20 and are provided with nuts 27 and 28. The nuts 27 serve to hold the screws and the arm 25 in place, while the nuts 28 are used to hold the ends of a plurality of circuit wires in place. Connected to the screw post 21 is a battery wire 29. A field wire 30 is connected to the screw post 22 while a wire 31 leading to the coil is secured to the screw post 23. An armature wire 32 is connected to the screw post 24. The four wires mentioned are all insulated and are enclosed in the cable 33, which projects into the hood 20 through an opening 34.

Slidably projecting through the shank 17 of the casing 18 is a stem or plunger rod 35, the projecting end of which is rounded and projects into the housing 2 into the path of the arm 14 on the locking collar 12. A head 36 is integrally formed on the inner end of the stem 35 and has position thereagainst an insulation disk 37. Contacting the disk 37 is a switch head 38 of insulating material and provided with a beveled flange. A metal contact ring 39 is secured around the periphery of the head 38 and around the beveled surface of the flange. A screw 40 is used to hold the head 38 and the disk 37 secured to the head 36 and the stem 35. A coiled spring 41 is positioned within the casing 18 between the insulation plate 19 and the head 38, and serves to resiliently hold the beveled surface of the contact ring 39 in contact with the hooks 26 of the terminal arms 25, and also acting to hold the stem 35 projected below the arm 14 as illustrated in Figure 1 when the locking collar 12 is in an elevated release position.

The operation is as follows:

The gear shift lever 6 is adapted to be locked against movement when in its neutral position by simply inserting the proper key into the lock 15 and turning the barrel of the lock. Rotation of the barrel of the lock actuates the rod connected by the locking collar 12 and serves to slide the collar 12 downwardly on the lever stem 11 from the position illustrated in Figure 1 into a locking position wherein the lugs 13 project into the notches provided in the blocks 4 on the transmission rods 3. The gear shift lever is thus locked against movement in its neutral position.

When the gear shift lever is locked against movement in its neutral position by the lowering of the locking collar 12, the arm 14 on said collar is also moved downwardly and acts to engage the rounded end of the plunger rod 35, thereby pushing said rod outwardly against the action of the control spring 41. Movement of the plunger rod into the casing 18 causes the beveled contact ring 39 to move out of contact with the various contact hooks 26 on the terminal arms 25, thus simultaneously breaking the various electrical circuits of the automobile whenever the gear shift lever is locked.

Release of the lever locking mechanism automatically causes the arms 14 to move upwardly out of engagement with the switch plunger rod 35, thereby allowing the spring 41 to move the contact ring 39 back into engagement with the various contact hooks 26 of the different circuits. The various circuits are thus established with the movement of the locking collar 12 into its elevated release position.

I am aware that numerous details of construction may be varied through a wide range without departing from the principles of this invention, and I therefore do not purpose limiting the patent granted otherwise than necessitated by the prior art.

I claim as my invention:

1. The combination with a gear shift lever, of a locking member slidably engaged thereon, means for operating the same, a switch controlling an electrical circuit, a plunger forming a part thereof, and an arm on said locking member adapted to actuate the plunger to open said circuit when the locking member is moved into locking position by said means.

2. The combination with a gear shift lever, of a housing therefor, a plunger connected to said housing having a switch thereon connected in an electrical circuit, said plunger being spring pressed in position for holding said switch closed, locking means for locking said lever in neutral position, and means associated with said first means for simultaneously actuating said plunger for opening said switch.

3. The combination with a gear shift lever, of a housing therefor having a switch housing secured thereon, a reciprocable plunger in said switch housing extending into said first housing, a switch in said switch housing connected to said plunger, a spring in said switch housing closing said switch and holding said plunger in extended position, locking means for locking said lever in neutral position, and means associated with said first means for simultaneously actuating said plunger for opening said switch.

In testimony whereof I have hereunto subscribed my name.

COLVIN L. JOHNSON.